United States Patent [19]

Lauck

[11] 4,016,718
[45] Apr. 12, 1977

[54] GAS TURBINE ENGINE HAVING AN IMPROVED TRANSITION DUCT SUPPORT

[75] Inventor: Lawrence J. Lauck, South Windsor, Conn.

[73] Assignee: United Technologies Corporation, Hartford, Conn.

[22] Filed: July 21, 1975

[21] Appl. No.: 597,876

[52] U.S. Cl. .............................. 60/39.32; 60/39.37
[51] Int. Cl.² ....................... F02C 7/20; F02C 3/00
[58] Field of Search ........... 60/39.31, 39.32, 39.37, 60/39.65, 39.66; 415/134, 138

[56] References Cited

UNITED STATES PATENTS

| | | | |
|---|---|---|---|
| 2,702,454 | 2/1955 | Brown .............................. | 60/39.31 |
| 2,743,579 | 5/1956 | Gaubatz ........................... | 60/39.37 |
| 3,099,134 | 7/1963 | Calden et al. .................... | 60/39.65 |
| 3,609,968 | 10/1971 | Mierley et al. ................... | 60/39.32 |
| 3,670,497 | 6/1972 | Sheldon ........................... | 60/39.32 |
| 3,750,398 | 8/1973 | Adelizzi et al. .................. | 60/39.32 |
| 3,759,038 | 9/1973 | Scalzo et al. ...................... | 415/134 |

*Primary Examiner*—Carlton R. Croyle
*Assistant Examiner*—L. J. Casaregola
*Attorney, Agent, or Firm*—Vernon F. Hauschild

[57] ABSTRACT

An axial flow gas turbine engine is provided with a plurality of combustion chambers distributed circumferentially about the engine axis and a plurality of transition ducts which carry propulsive gases between the burners and an annular turbine inlet at a bulkhead between the combustion and turbine sections of the engine. Support for the transition ducts at the turbine inlet is provided by an outer support ring fixedly secured to the engine bulkhead and an inner support ring which is held by a plurality of struts from the outer support ring. Flexible sealing means extend between the inner support ring and the bulkhead adjacent the turbine inlet to permit the inner ring to expand or contract radially with the transition ducts and at the same time to prevent compressed air from flowing directly into the turbine section. The outer ring and the flexible sealing means are apertured to permit a limited flow of relatively cool compressor air to enter the turbine along with the propulsive gases and thereby cool the support structure and the inlet guide vanes of the turbine.

12 Claims, 9 Drawing Figures

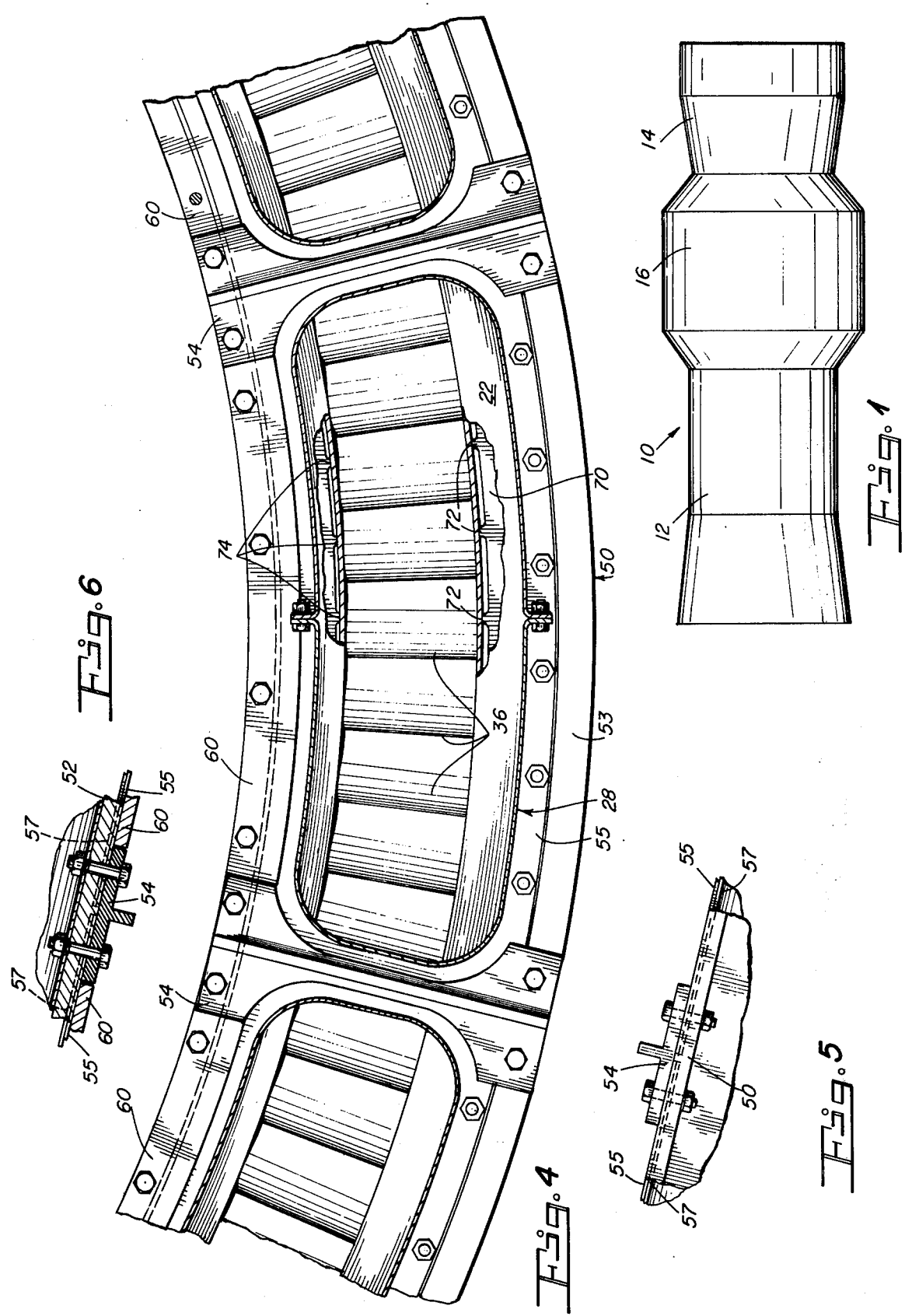

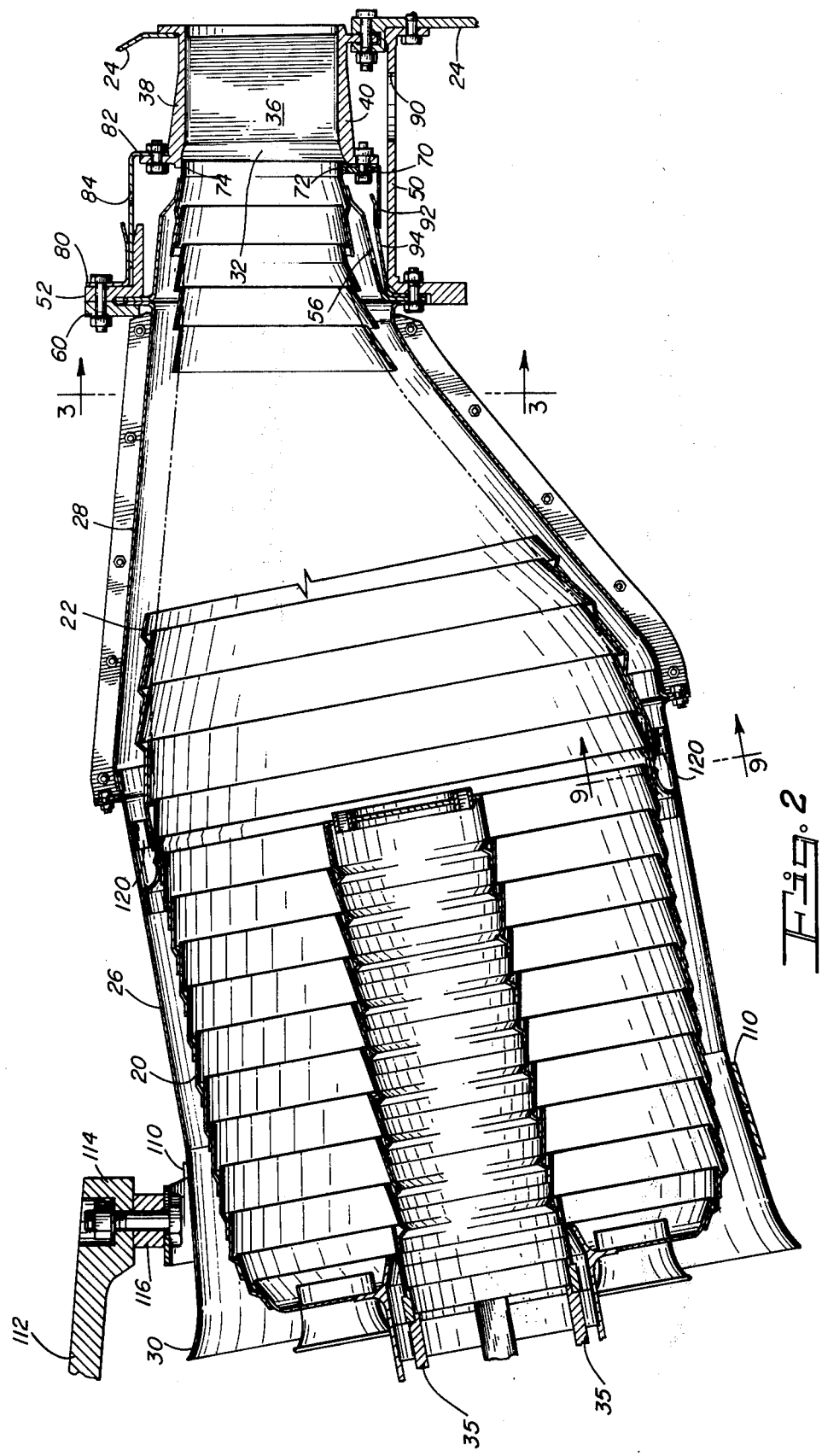

GAS TURBINE ENGINE HAVING AN IMPROVED TRANSITION DUCT SUPPORT

BACKGROUND OF THE INVENTION

The present invention relates to an axial flow gas turbine engine in which fuel burners are connected by transition ducts to a turbine inlet. The transition ducts are flexibly supported within the engine to tolerate the high temperatures of the propulsive gases transmitted from the burners through the transition ducts to the inlet.

In all gas turbine engines, burners in the combustion section receive and react fuel and compressed air to produce propulsive gases which are transmitted from the burners to the turbine section and propel one or more turbine wheels. The turbine wheels drive either the engine compressor or a power shaft from which the engine power is taken. The burners, sometimes referred to as burner cans, are usually cylindrical in shape and are distributed circumferentially about the engine axis to receive compressed air from the engine compressor and fuel from the fuel system. The fuel and air are mixed within the burners and are ignited in a combustion process which produces the propulsive gases. The gases are transmitted from the burners to the turbine inlet through transition ducts which become relatively hot due to the high temperature of the propulsive gases. Special provisions are sometimes made at the turbine inlet in order to cool the hot components in that region.

U.S. Pat. No. 2,743,579 discloses a gas turbine engine having burners including a transition portion which varies in shape along its axial length from a generally circular form at the forward end to an arcuate form at its aft end so that a series of such transition portions may mate with an annular turbine inlet. The arcuate ends are supported by inner and outer rings and a plurality of struts extending between the rings, each ring being secured to the engine frame. To alleviate thermal stresses that might be generated in the support rings, and inlet guide vanes, cooling air from the compressor is directed into the transition portion over the rings and through the guide vanes.

The present invention has as a general object the provision of the improved structure for supporting transition ducts at the turbine inlet with greater compliance in the presence of the high temperature propulsive gases. It is also an object of the invention to provide bulkhead sealing between the combustion and turbine sections and thereby impede the leakage of compressed air directly into the turbine inlet.

SUMMARY OF THE INVENTION

The present invention resides in structure for supporting transition ducts between a plurality of circumaxially disposed burners and a turbine inlet in an axial flow gas turbine engine. To direct the flow of propulsive gases uniformly into the various sectors of the inlet, the transition ducts are also distributed circumaxially about the engine and have a varying configuration between the forward end connected with the burners and the aft end connected with the turbine inlet.

The improved support for the transition ducts at the turbine inlet includes an outer support ring positioned in the engine coaxially of the engine axis, and the ring connects with each of the plurality of transition ducts. The ring circumscribes the transition ducts adjacent the turbine inlet and, therefore, lies radially outside of the ducts in the engine.

An inner support ring is also positioned in the engine coaxially of the engine axis and connects with each of the plurality of transition ducts. The inner ring is located radially within the transition ducts adjacent the turbine inlet and in the illustrated embodiment connects with the ducts in substantially the same axial plane of the engine as the outer ring.

A plurality of struts extend between the inner and outer rings and are interdigitated with the transition ducts so that one of the rings supports the other of the rings as well as the transition ducts. One of the support rings, for example the outer support ring, is fixedly secured in the engine to a bulkhead between the combustion and turbine sections, and the other of the support rings, the inner ring in the example, is thus free to float and expand or contract radially in the engine with the transition ducts.

Flexible sealing means extends between the turbine inlet and the ring which is free to expand to impede the leakage of compressed air from the combustion section into the turbine. A limited quantity of compressed air is permitted to flow through the sealing means and the fixed support ring to provide cooling for the inlet guide vanes.

By allowing one of the support rings to expand and contract with the transition ducts and by cooling the components at the turbine inlet, stresses at the high temperature or "hot" section of the engine are significantly alleviated.

BRIEF DESCRIPTION OF THE DRAWINGS

FIG. 1 illustrates the profile of a gas turbine engine in which the present invention may be employed.

FIG. 2 is a cross section of a burner and transition duct in the combustion section of the engine and shows the improved support for the transition duct at the inlet of the turbine section of the engine.

FIG. 4 is an enlarged, fragmentary view showing a sector of the engine in FIG. 3 and the support for the transition ducts in detail.

FIG. 5 is a fragmentary view looking radially inward of the engine at the line 5—5 in FIG. 4.

FIG. 6 is a fragmentary view looking radially outward of the engine at the line 6—6 in FIG. 4.

DESCRIPTION OF THE PREFERRED EMBODIMENTS

Figure 9:
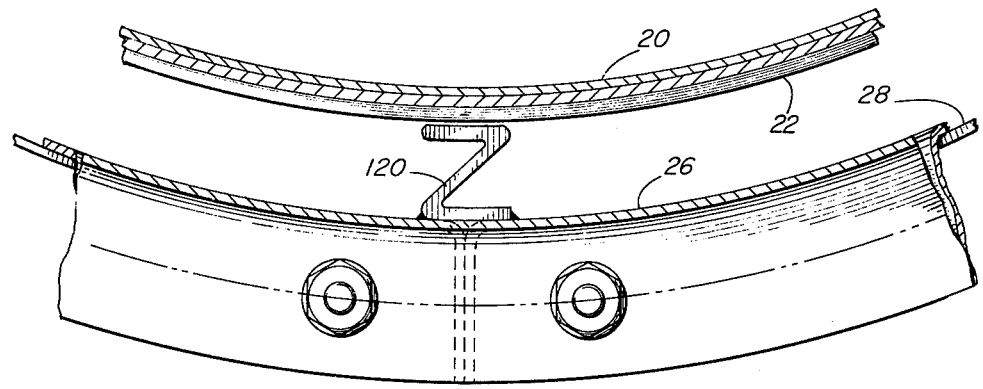
FIG. 9 is a fragmentary view showing a spacer between a burner and shroud as viewed along the sectioning line 9—9 in FIG. 2.

FIG. 1 illustrates a gas turbine engine, generally designated 10, of the axial-flow type which includes a multi-stage compressor section 12, a turbine section 14, and a combustor or combustion section 16 interposed between the sections 12 and 14. Air is ingested into the compressor at the front of the engine and flows generally axially through the compressor into the combustion section where it combines with fuel in a combustion process. Propulsive gases produced by the combustion process are then utilized to drive single or multi-stage turbines in the section 14. If the engine is a thrust engine such as used in aircraft, the combustion or propulsive gases are expelled at high velocity through a diffuser at the rear of the engine. If the engine is a power turbine such as used in an industrial power plant, the combustion gases drive a power turbine connected through a power shaft to an electrical generator or other equipment.

FIG. 2 shows a burner or burner can 20 in which compressed air from the compressor section of the engine is combined with fuel in the combustion process which produces the propulsive gases. The specific burner illustrated is shown and described in greater detail in copending U.S. patent application, Ser. No. 597,877, filed July 21, 1975, and entitled "Combustion Chamber Assembly Having Removable Center Liner", which application has the same assignee as the present application. The burner 20 is connected by means of a transition duct 22 to an annular inlet generally designated 32 of the turbine section at an engine wall or bulkhead 24 between the combustion and turbine sections. Air shrouds 26 and 28 extend over the burner 20 and transition duct 22 respectively and are annularly spaced from the burner and duct. The forward end of the shroud 26 has a flared mouth 30 to permit compressed air from the compressor section to enter the burner through apertures in both the forward end of the burner and the lateral sides of the burner. In the latter case, the air passes through the annular space between the burner and shroud 26, and by correctly sizing the shroud and the burner apertures, the distribution of air within the shroud and the flow of air into the burner can be regulated. It is also contemplated that additional apertures may be provided in the forward end of the transition duct to allow further combustion to take place within the duct.

Figure 3:
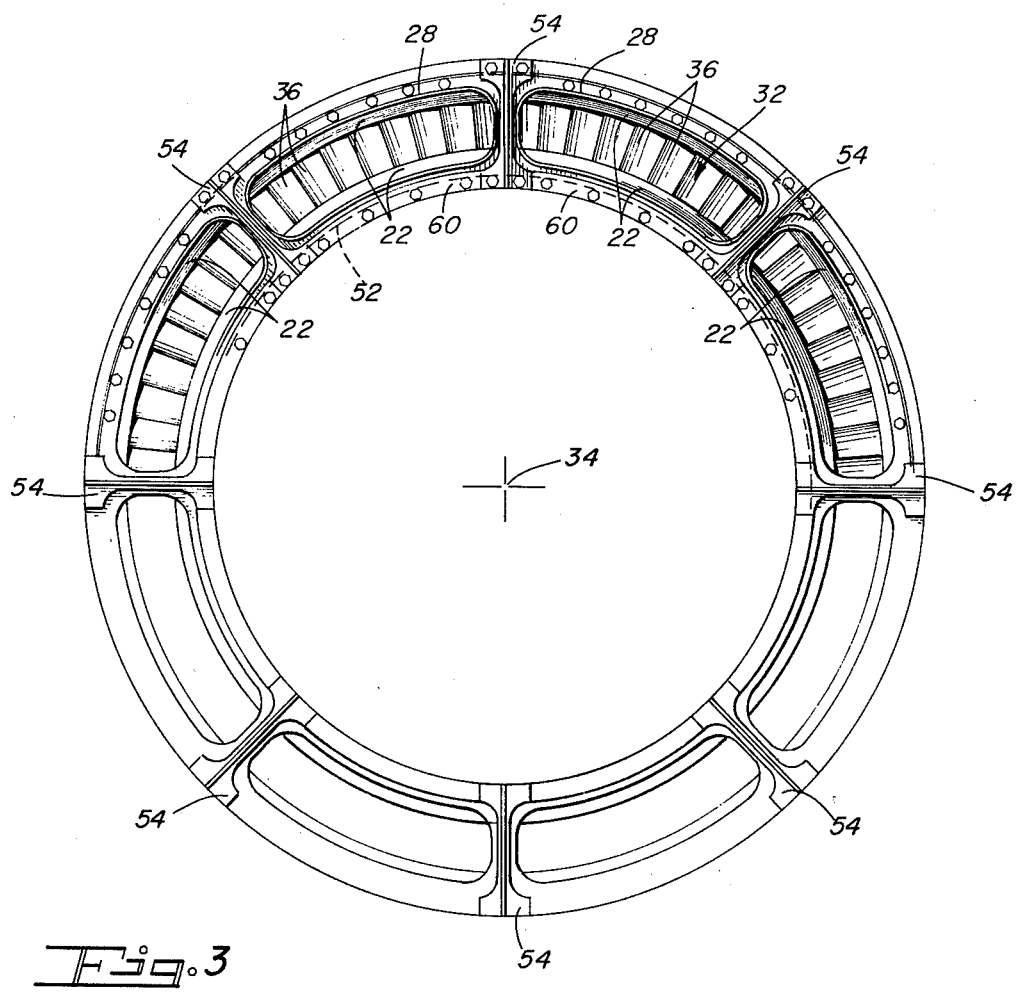
FIG. 3 is a cross-sectional view of the engine at the sectioning line 3—3 in FIG. 2.

The burner 20 has a generally cylindrical configuration and has a rear end which is held seated in the forward end of the transition duct by support arms 35 attached elsewhere in the combustion section. Therefore, the forward end of the transition duct has a circular configuration. The opposite or rear end of the transition duct has a generally arcuate configuration since it connects with a sector of the annular turbine inlet 32. In the combustion section of the engine, a plurality of such burners and corresponding transition ducts are distributed circumaxially about the engine axis so that the propulsive gases produced may enter the turbine at all sectors of the inlet. For example, FIG. 3 illustrates eight shrouds 28 and the enveloped transition ducts 22 distributed equally about the engine axis 34 and the corresponding sectors of the annular turbine inlet 32. Of course, the number of burners and transition ducts may be varied according to the size and other requirements of the engine.

Figure 7:
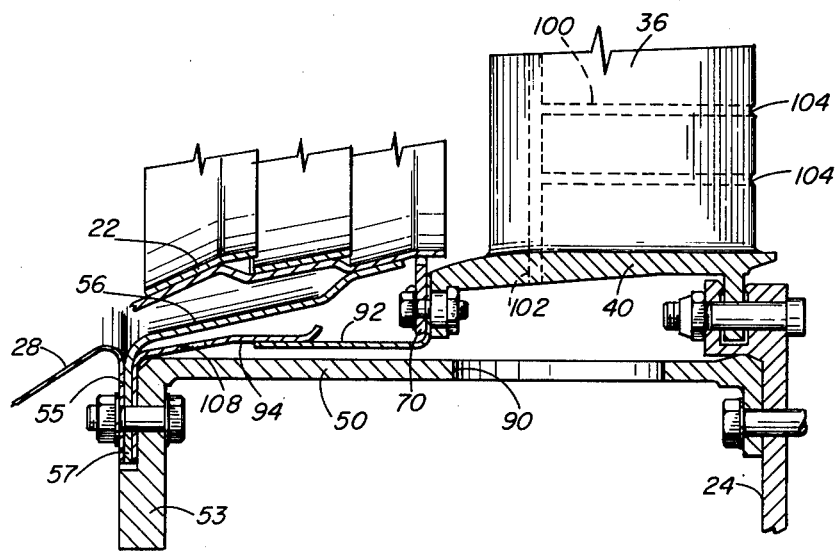
FIG. 7 is a fragmentary view showing the connection between the transition duct and the outer support ring at the turbine inlet.

The annular inlet 32 contains a series of inlet guide vanes 36 which direct the propulsive gases into the first stage (not shown) of the turbine section. As shown in FIG. 2, each vane bears a radially inner vane platform 38 and a radially outer vane platform 40, and the platforms of adjacent vanes abut one another to define the radially inner and outer walls respectively of the annular turbine inlet 32. The rear, arcuate-shaped end of the transition ducts 22 project into the inlet formed by the vane platforms so that propulsive gases passing through the transition duct are directed against the guide vanes 36. The guide vanes are bolted or otherwise connected rigidly to the bulkhead 24 as shown in FIGS. 2 and 7 and thus are fixed at a given radial and axial station in the engine.

It will be readily understood that the hot propulsive gases flowing continuously through the transition duct into the turbine inlet create substantial temperature increases and thermal expansion at the rear end of the transition duct. The inlet guide vanes 36 are also continuously bathed in the propulsive gases and, as explained in greater detail below, it is desirable to direct compressed air from the combustion section over and through the guide vanes for cooling. In accordance with the present invention an improved support for the rear end of the transition ducts is provided to prevent thermal stresses that might develop by virtue of differential expansions and contractions of the transition ducts and turbine inlet and to provide the desired cooling of the guide vanes.

As shown in FIGS. 2, 3 and 4, the support for the rear end of the transition ducts comprises an outer support ring 50 circumscribing the engine axis 34, an inner support ring 52 also circumscribing the engine axis and a plurality of struts 54 extending radially between the inner and outer rings 50 and 52. The outer ring 50 is bolted or otherwise fixedly secured to the bulkhead 24 of the engine as illustrated in detail in FIG. 7 and projects axially forward in the engine with a flange portion 53 of the ring being placed at a given axial station in the engine. The flange 53 is bolted to a flange 55 on the shroud 28 and a flange 57 on the sleeve 56 which is welded to the rear end of the transition duct. The sleeve 56 extends around the rearward end of the transition duct and projects forward coaxially of the duct so that the flange 57 on the sleeve is located away from the turbine inlet and, therefore, is thermally more compatible with the flange 55 on the shroud 28.

It will be understood that the connection between the rings 50 and 52 and each of the transition ducts and shrouds is the same and, consequently, the following description is devoted solely to one of the shrouds and corresponding transition duct unless a contrary intent is clearly indicated.

The inner ring 52 extends coaxially around the engine axis radially within the plurality of transition ducts and is situated at the same axial station in the engine as flange portion 53 on the outer ring 50. While the flange 57 on the sleeve 56 surrounding the transition duct 22 and the flange 55 on the shroud 28 are bolted to the flange portion 53 of the outer ring 50 as shown most clearly in FIG. 4, the flanges 55 and 57 are clamped in a recess of the inner ring 52 by means of a clamping plate 60 shown in FIGS. 2, 3 and 4. The struts 54 extending in interdigitated relationship with the transition ducts between the inner and outer rings also aid in clamping the flanges to such rings and hold the flanges 55 and 57 of the sleeves 56 and shrouds 28 in clamped relationship at the mergence of adjacent transition ducts and shrouds as shown most clearly in FIG. 8. The clamped relationship of the struts 54, the shrouds 28, the sleeves 56 and the inner ring 52 relieves stresses that would be generated by thermal expansion if the ring 52 and flanges 55 and 57 were bolted together in conjunction with the bolting arrangement between the same flanges and the outer ring 50. The clamping and bolting arrangement also aids in forming a bulkhead seal which prevents the leakage of compressed air in the combustion section directly into the turbine inlet and the consequent adverse pressure distribution within the combustion chambers and transition ducts.

It will be observed in FIGS. 2 and 7 that the rear end of the transition duct 22 terminates within the turbine inlet in spaced relationship with the inlet walls formed by the vane platforms 38 and 40. A positioning plate 70 is bolted to the radially outer vane platforms and has a plurality of lands 72 projecting radially inward of the engine at circumferentially spaced locations along the plate to establish a reference plane during assembly against which the transition duct rests. A similar set of lands 74 in FIG. 4 are provided on the inner vane platforms 38 for the same positioning function. It will be understood that the sleeve 56 and duct 22 are made from a heavy gauge sheet metal such as stainless steel and, therefore, may flex to a limited degree to allow the positioning plate 70 and lands 72 and 74 to establish the final location of the duct within the turbine inlet. In its proper position, the transition duct 22 is spaced slightly from the walls of the inlet to allow regulated quantities of compressed air in the combustion section to flow over the vane platforms for cooling as described in greater detail below.

In FIG. 2 a sealing means is interposed between the inner support ring 52 and the vane platforms 38 forming the inner wall of the turbine inlet as part of the bulkhead seal which impedes the leakage of compressed air from the combustion section into the turbine section. The sealing means illustrated is comprised of a flexible ring 80 bolted or otherwise connected to the inner ring 52 and a flexible, apertured ring 82 attached to the vane platforms 38. Both rings 80 and 82 circumscribe the engine axis and are constructed of a metal such as stainless steel so that they may withstand elevated temperatures and flex by limited amounts to accommodate differences in the radial expansions of the support ring 52 and the blades 36 at the turbine inlet 32. The ring 82 contains a plurality of apertures 84 distributed along the circumference of the ring, and the apertures have a set diameter to limit the quantity of compressed air which may leak through the sealing means into an annular cooling chamber between the rings 80 and 82 and the transition ducts 22. After reaching the cooling chamber, the air passes the end of the transition duct and flows over the vane platforms to provide cooling. Thus, the sealing means assists in cooling the turbine inlet to reduce radial contraction and expansion and also flexes slightly to accommodate any such expansion or contraction of the inner support ring 52 and the transition duct.

Cooling at the radially outer surfaces of the transition ducts is provided primarily by a plurality of apertures 90 distributed circumferentially about the outer support ring 50. As shown most clearly in FIG. 7 compressed air from the combustion section passes through the apertures 90 into an annular cooling chamber having walls defined in part by the outer ring 50, the vane platforms 40 and the pair of baffle rings 92 and 94 which circumscribe the engine axis along with the ring 50. In one form of the invention, the inlet guide vanes 36 are provided with internal cooling ducts 100 which extend between an inlet port 102 in the vane platform 40 and a plurality of discharge ducts 104 at the trailing edge of the vanes. Thus, compressed air entering the annular cooling chamber through the apertures 90 passes through the port 102 and the ducts 100 within the guide vanes 36 and is discharged from the guide vanes at the ports 104 to join with the propulsive gases entering the turbine section. Due to the significant temperature differential between the relatively cooler compressed air from the combustion section and the hot propulsive gases, substantial cooling of the inlet guide vanes is obtained.

Another portion of the cooling air entering the chamber within the outer ring 50 passes through a series of circumaxially spaced apertures 108 in the baffle ring 94. Once within the ring 94, the air is free to pass over the sleeve 56 and between the positioning plate 70 and the rear end of the transition duct 22. The air then flows over the vane platforms to provide surface cooling of the outer wall of the turbine inlet.

Figure 8:
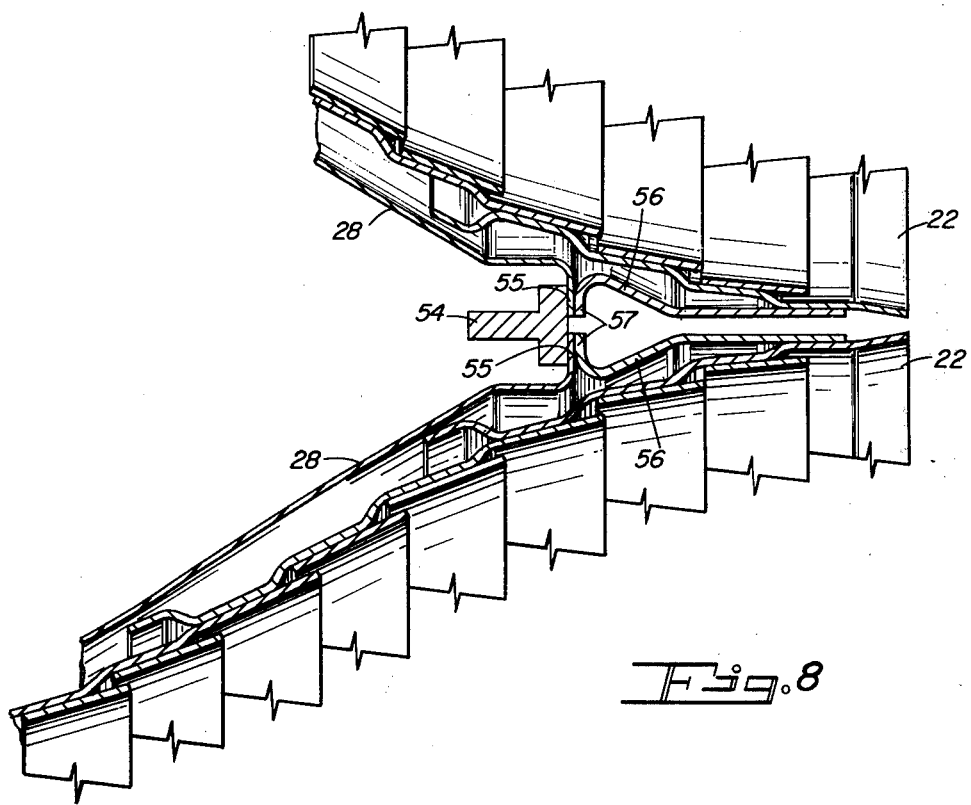
FIG. 8 is a fragmentary sectional view at the mergence of two transition ducts as seen along the sectioning line 8—8 of FIG. 4.

It should be noted that the cooling air which passes through the apertures 108 in the baffle ring 94 may join with the cooling air which passes through the apertures 84 in the ring 82 since the cooling chambers extend around the engine radially inside and outside of the ducts 22, and the sleeves 56 of adjacent transition ducts are spaced slightly from one another at the mergence of adjacent transition ducts as shown in FIG. 8. Thus, cooling around the entire periphery of each transition duct is obtained at the turbine inlet 32. The cooling air which eventually passes into the turbine section is limited by the apertures 84 and 90 to an extent that any dilution of the propulsive gases is minimal and does not effect engine operation.

From the above description, it is apparent that the outer support ring 50, the inner support ring 52 and the struts 54 provide the support for the transition duct 22 and the shroud 28 adjacent the turbine inlet 32. At the forward end, the shroud 28 is provided with a flange which is bolted or otherwise joined to the rear flange of the shroud 26 surrounding the burner 20, and the shroud 26 is suspended adjacent its forward end by a strap 110 from a structural point within the engine such as the trailing edge of the compressor diffuser 112. The strap 110 circumscribes and is preferably spot welded to the shroud 26, and engages the head of a bolt 114 which is secured in the diffuser. A spacer 116 between the diffuser and the strap 110 fixes the position of the shroud at the forward end and serves as a seat against which the strap is pulled when the bolt 114 is tightened. It will be understood that the bolt provides a single point attachment and thus it is desirable for the spacer to provide a seat which accordingly limits movement that the single point attachment might otherwise allow.

To maintain the desired spacing between the shrouds 26 and 28, the burner 20 and transition duct 22, a plurality of Z-shaped spacers 120 are distributed evenly about the cylindrical burner near the junction of the burner and the transition duct as shown in FIG. 2. In one embodiment, four such spacers are utilized. As shown most clearly in FIG. 9, the spacer is preferably welded or otherwise attached to the shroud 26 and is interposed between the forward end of the transition duct and the shroud so that the burner 20 can be removed and replaced independently of the transition duct and the shrouds. The shroud 26 surrounding the burner 20 is removed by disconnecting the bolt 114 from the diffuser 112 and separating the rear flange from the forward flange of the shroud 28. The shroud 28 and the transition duct 22 are removed from the engine together by separating these components from the support rings 50 and 52. The shroud 28 splits at flanges along its midplane so that it can be disassembled and assembled over the transition duct.

In summary, the improved support for the transition ducts at the turbine inlet permits radial expansions and contractions in the presence of the high temperature propulsive gases which pass through the transition duct into the turbine section. The support also cooperates with the ducts and shrouds to form a bulkhead seal between the combustion and turbine sections and thereby impede the leakage of compressor air into the turbine inlet. Cooling of the transition ducts and the walls of the turbine inlet is also accommodated by the support mechanism.

While the present invention has been described in a preferred embodiment, it should be understood that numerous substitutions, modifications can be made without departing from the spirit of the invention. For example, it should be readily apparent that although the outer structural ring 50 is fixedly secured to the bulkhead 24 and the inner support ring 52 is allowed to shift relative to the bulkhead, the support functions of the rings can be reversed. Thus, the inner support ring 52 may be fixedly secured to the bulkhead and the outer ring 50 may be supported by the struts from the inner ring for limited movement relative to the bulkhead. In such case flexible sealing means similar to the rings 80 and 82 would be provided between the ring 50 and the vane platforms 40 defining the outer wall of the inlet. Accordingly, the present invention has been described in a preferred embodiment by way of illustration rather than limitation.

I claim:

1. In combination in an axial flow gas turbine engine having a combustion section including a plurality of burners disposed circumferentially about the engine axis for receiving and mixing compressed air and fuel in a combustion process to produce propulsive gases which are transmitted from the plurality of burners through a plurality of circumferentially disposed transition ducts between the respective burners and a turbine inlet at the turbine section, the improvement comprising:
   an outer support ring connected to the plurality of transition ducts and positioned in the engine coaxially of the engine axis, the outer ring circumscribing the transition ducts radially outside of the ducts;
   an inner support ring connected to a plurality of transition ducts and positioned in the engine coaxially of the engine axis, the inner ring extending around the engine axis radially within the circumaxially disposed transition ducts;
   a plurality of struts extending from the outer support ring to the inner support ring, the struts being interdigitated between the transition ducts; and
   one of the support rings being fixedly secured in the engine between the combustion and turbine sections for holding the transition ducts in the engine, and the other of the support rings being suspended in the engine by the struts from said one of the support rings, said other of the support rings thereby being free to expand and contract radially in the engine with the transition ducts.

2. In an axial flow gas turbine, the improvement of claim 1 further including
   flexible sealing means circumscribing the engine axis and extending between said other of the support rings and the turbine inlet to impede the leakage of compressed air from the combustion section directly into the propulsive gases entering the turbine inlet.

3. The improvement of claim 2 wherein the sealing means is provided with leakage apertures through which a limited flow of compressed air enters the turbine inlet for cooling.

4. The improvement of claim 1 in an axial flow gas turbine having a turbine inlet defined by a series of inlet guide vanes bearing radially inner and radially outer vane platforms which platforms are serially interconnected to form inner and outer walls of an annular turbine inlet adjacent the corresponding inner and outer support rings, wherein:
   sealing means is interposed between said other of the support rings free to expand or contract and the corresponding wall of the turbine inlet and includes leakage apertures admitting a limited flow of compressed air into the inlet and over the vane platforms defining the corresponding turbine wall for cooling the platforms and vanes.

5. The improvement of claim 4 wherein:
   said one of the support rings fixedly secured in the engine defines a wall of a cooling chamber circumscribing the engine axis between the circumferentially disposed transition ducts and the vane platforms which form one wall of the turbine inlet, the support ring being apertured to admit compressed air to the chamber from the combustion section for cooling the vane platforms.

6. The improvement of claim 5 in an axial flow gas turbine having the transition ducts projecting into the turbine inlet with finite spacing between the vane platforms and the ducts wherein:
   said one of the support rings defining a wall of the cooling chamber extends axially of the engine between the vane platforms defining the turbine inlet wall and the transition duct to allow the compressed air from the cooling chamber to flow over the surface of the vane platforms.

7. The improvement of claim 6 in an axial flow gas turbine having interior cooling ducts in the inlet guide vanes of the turbine inlet wherein the cooling chamber also communicates with the cooling ducts of the inlet guide vanes for cooling the vanes internally.

8. The improvement of claim 1 in a gas turbine engine having the transition ducts projecting axially rearward in the engine to the turbine inlet wherein:
   said one of the support rings fixedly secured in the engine projects axially forward of the turbine inlet to a given axial station in the engine; and
   sleeves attached to each of the respective transition ducts adjacent the turbine inlet also project axially forward of the turbine inlet and are connected to said one of the support rings at the given axial station.

9. The improvement of claim 8 wherein:
   said other of the support rings free to expand and contract radially in the engine has at least one portion also located at the given axial station in the engine; and
   the sleeves circumscribe the respective transition ducts and attach to said other of the support rings at the given axial station.

10. The improvement of claim 1 wherein:
    shrouds extend over the respective transition ducts and also connect with the inner and outer support rings for support within the engine.

11. The improvement of claim 10 wherein:

the shrouds extend forward in the engine over the respective transition ducts and associated burners and define an annular space about the respective burners and transition ducts; and spacing means are interposed between the shrouds and the burners and ducts for maintaining the annular space as defined.

12. The improvement of claim 11 wherein:

further means are provided for connecting the forward ends of the shrouds to the engine in the combustion section.

* * * * *